Sept. 20, 1955 J. C. HEINTZ 2,718,571
THERMOSTAT

Filed March 5, 1951 4 Sheets-Sheet 1

INVENTOR.
JAMES C. HEINTZ
BY
ATTORNEY

Sept. 20, 1955 J. C. HEINTZ 2,718,571
THERMOSTAT
Filed March 5, 1951 4 Sheets-Sheet 2

INVENTOR.
JAMES C. HEINTZ
BY
*Gordon C. Mask*
ATTORNEY

Sept. 20, 1955 J. C. HEINTZ 2,718,571
THERMOSTAT
Filed March 5, 1951 4 Sheets-Sheet 3

INVENTOR.
JAMES C. HEINTZ
BY
*Jordon C. Mack*
ATTORNEY

Sept. 20, 1955    J. C. HEINTZ    2,718,571
THERMOSTAT
Filed March 5, 1951    4 Sheets-Sheet 4

INVENTOR.
JAMES C. HEINTZ
BY
*Jordan C. Mack*
ATTORNEY

United States Patent Office 2,718,571
Patented Sept. 20, 1955

2,718,571

THERMOSTAT

James C. Heintz, Lakewood, Ohio; The Cleveland Trust Company, executor of the said James C. Heintz, deceased, assignor, by mesne assignments, to The James C. Heintz Company Application March 5, 1951, Serial No. 213,921

2 Claims. (Cl. 200—137)

This invention relates to a thermostat designed particularly for installation in equipment for adhesively bonding friction lining material to a brake shoe.

The bonding equipment includes an improved mandrel for supporting a brake shoe. Means are provided to apply the heat and pressure necessary to cure the adhesive used in the bonding operation. The thermostat is used for controlling the temperature. It may also be used in other places than in bonding equipment.

Two brake shoes may be processed at the same time in the bonding device. The support for the shoes is slidably mounted in a guideway and is forced toward a flexible pressure member by a pressure cylinder through means which maintains the same uniform pressure on both brake shoes throughout the operation.

Each brake shoe is placed on a mandrel with an arcuately curved, convex upper surface. A peripheral slot extends radially inwardly from this surface to receive the web of the shoe. Heating coils are arranged in cavities formed in the sides of the mandrel and these coils quickly heat the mandrel to proper curing temperature. The heating coils are designed so that they may be easily replaced should they become broken or burned out. The flange of the brake shoe is heated by conduction from the convex surface of the mandrel and the web is heated by radiation from the walls of the slot. The mandrel is designed to receive adapters of various sizes so that different sizes of brake shoes may be processed in the device. The adapters are novel and are designed particularly for this mandrel. The brake shoes are heated by the adapters in the same manner in which they are heated when they are supported directly on the mandrels.

The temperature of the mandrel is regulated by the improved thermostatic device which is particularly sensitive to changes in the temperature of the mandrel. This thermostat includes an element which is adapted to change in length quite rapidly in response to a change in the temperature of the mandrel. The elongation or contraction of this member flexes a second member which opens and closes the circuit supplying power to the mandrels thereby maintaining a uniform curing temperature for the adhesive used to bond the lining to the shoe. The thermostat is connected in a circuit which includes means for visually indicating when power is being supplied to the heating coils.

The bonding device includes an electro-magnetically operated valve which controls the supply of fluid to the pressure cylinder. The operation of this valve is advantageously controlled by a timing switch which causes the valve to open and relieve the pressure on the brake shoe when the bonding operation is completed. There is another switch which is operable to bypass the timer so that when the mandrel is cold or when a cold adapter is placed on a mandrel the mandrel and/or the adapter will be heated to proper curing temperature before the timing switch is brought into operation. This provides for heating the mandrel and adapter together in only a little longer time than normally required to heat the mandrel alone.

The invention will be further described with reference to the accompanying drawings, in which—

Figure 8:
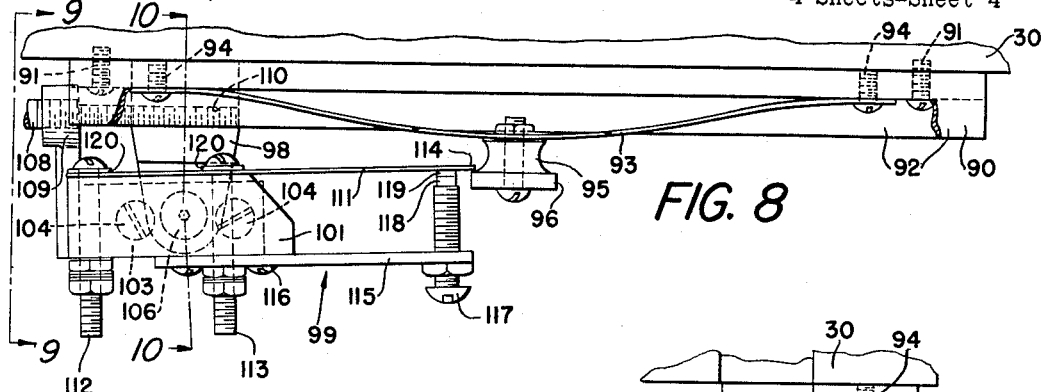
Fig. 8 is an enlarged side view of the thermostatic device.
Figure 10:
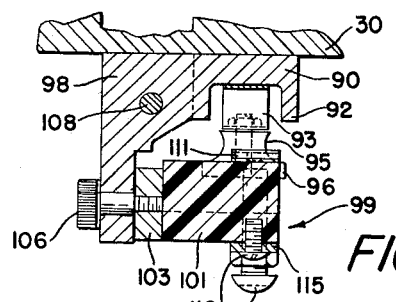
Figure 9:
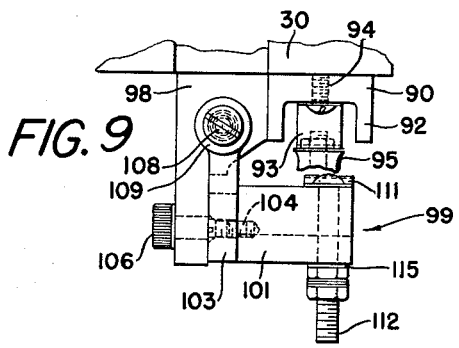
Figure 11:
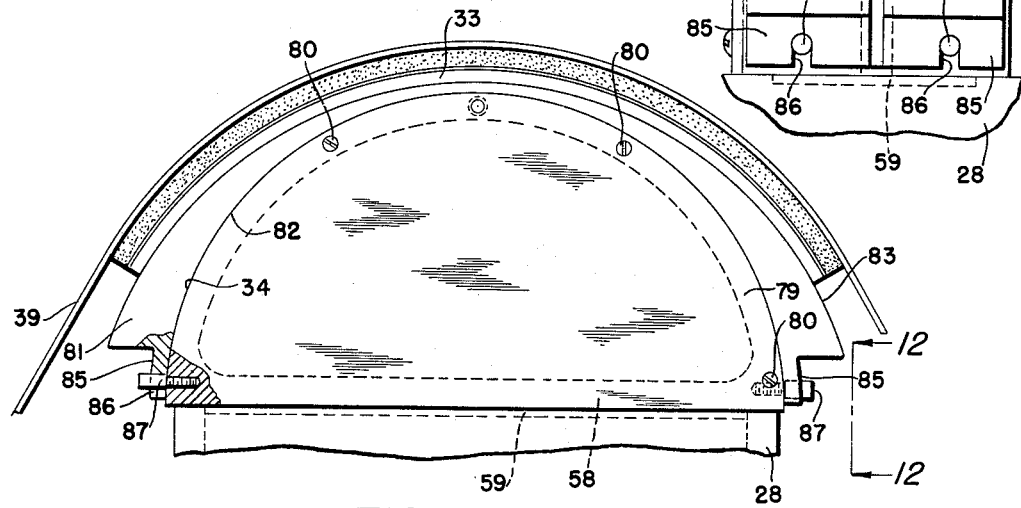

Figs. 9 and 10 are an end view and section taken along the lines 9—9 and 10—10, respectively, of Fig. 8;

Fig. 11 is a side view of a mandrel with an adapter positioned thereon; and

Figure 12:
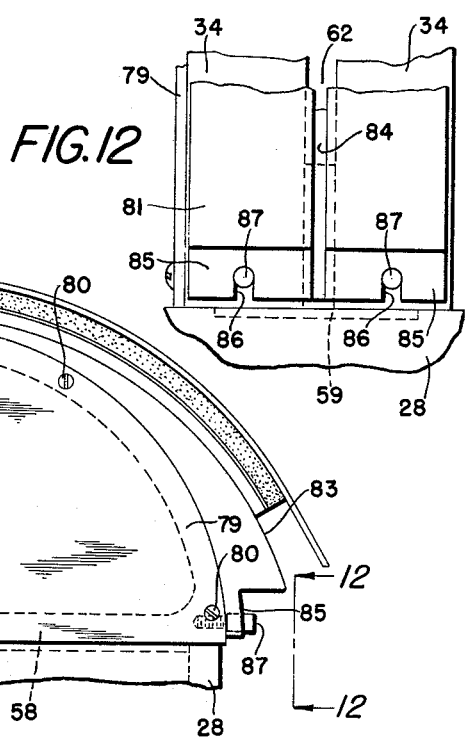

Fig. 12 is an end view taken on the line 12—12 of Fig. 11.

Figure 1:
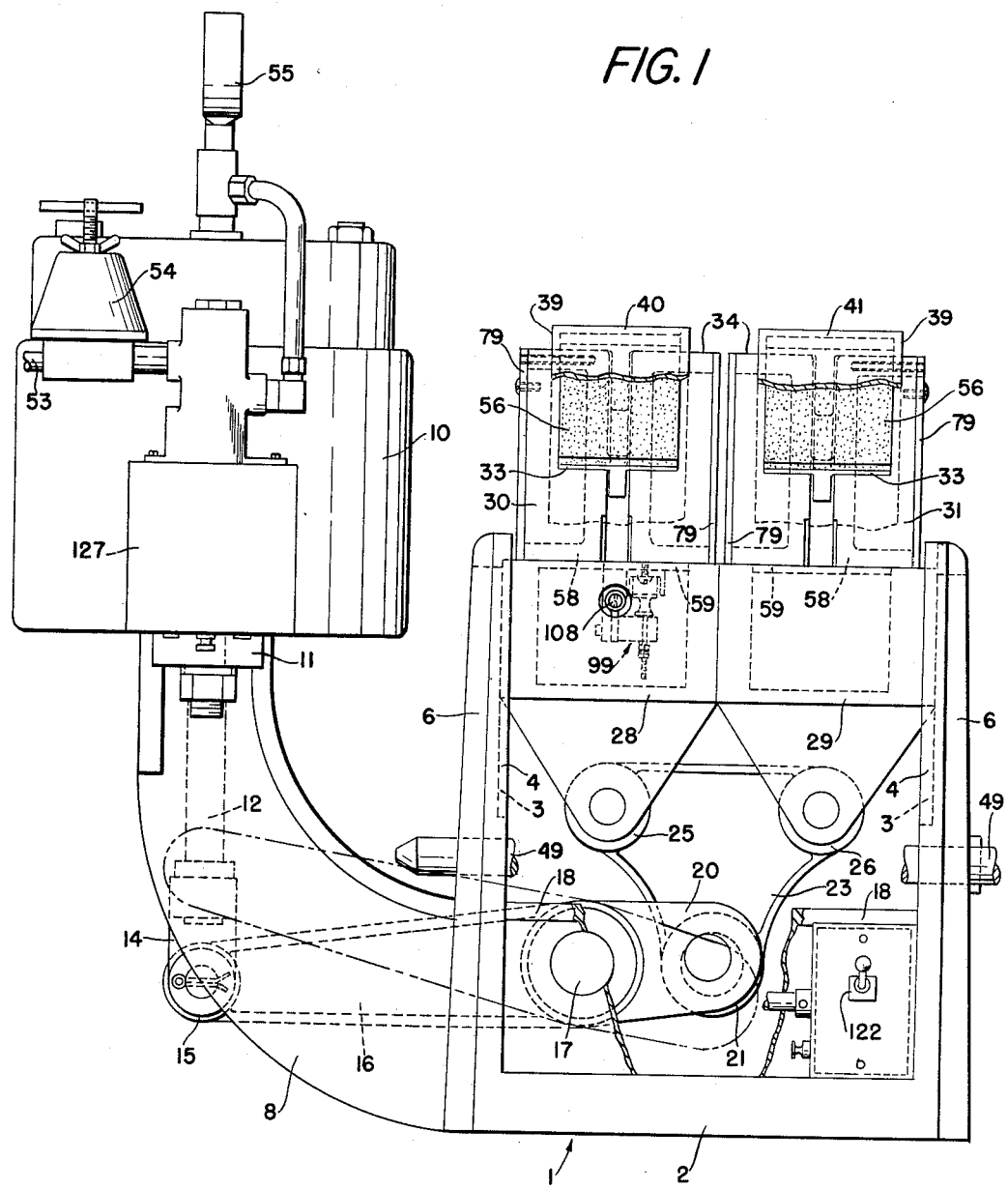
Fig. 1 is a side elevation of preferred bonding equipment with a brake shoe being cured therein, a portion of the flexible pressure members being broken away.

The bonding device includes a casting 1 having a base portion 2 with guideway 3 formed by inwardly facing corners 4 of the two pairs of parallel vertical plates 5, 5 and 6, 6. The plates 5 are located on opposite sides of base 2 near one end of the base. The plates 6 are located in corresponding positions at the other end of the base. Two parallel arms 8 (only one of which is shown in Fig. 1) extend rearwardly from the center of the base 2 just behind the guides. These arms are curved upwardly and the pressure cylinder 10 is supported on the upper end 11 of these arms. The piston rod 12 projects downwardly from the bottom of the cylinder 10 between the arms 8.

Figure 2:
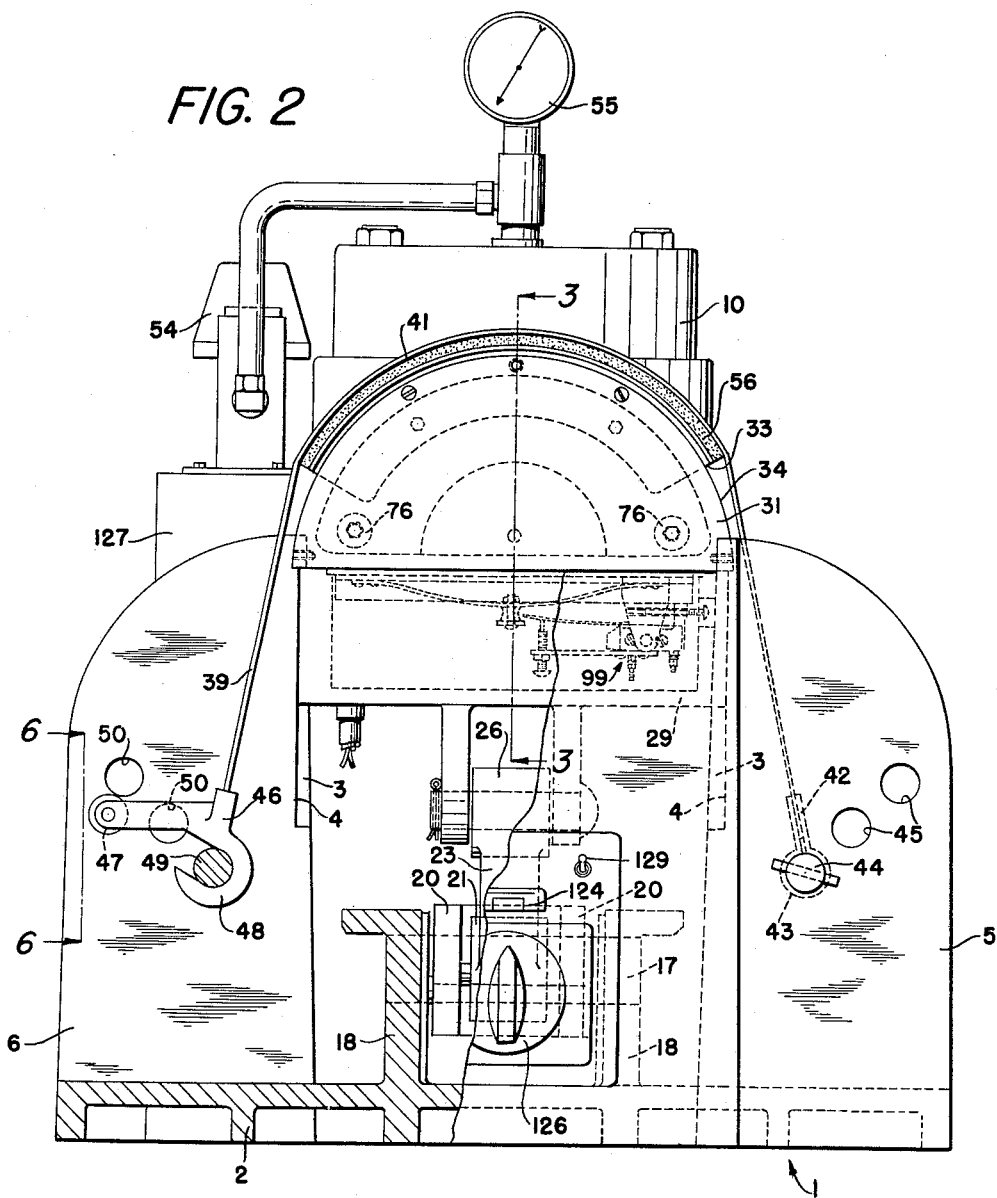
Fig. 2 is a front elevation of the same, a portion of the front of the device being broken away.

The lower end of the piston rod is provided with a clevis 14 which is pivotally connected to the outer end 15 of a rocker arm 16. The arm 16 is mounted to rock on a pivot 17 located intermediate the ends of the arm. Pivot 17 is supported by the members 18 which project upwardly from the base 2 below the guides. The inner end 20 of the rocker arm which is fork-shaped projects forwardly from the pivot 17 and is pivotally connected with the bottom corner 21 of the three-cornered member 23. The two upper corners 25 and 26 of this member are pivotally engaged, respectively, with the bottom of the boxes 28 and 29 which are slidable in the vertical guideway 3. The mandrels 30 and 31 are supported on the boxes 28 and 29, respectively. Each mandrel is adapted to support a brake shoe 33 on its upper convex surface 34, as shown in Figs. 1 and 2.

The end 20 of arm 16 is loosely connected to corner 21 of the three-cornered member 23 so that the boxes 28 and 29 are movable vertically in the guideway independently of each other. Differences in the thicknesses of the linings cause the member 23 to tilt to one side or the other during the bonding operation so that equal and uniform pressure is applied to each shoe. Uniform pressure is thus maintained on both linings even though a certain amount of adhesive may be absorbed by either or both linings during the operation.

Figure 6:
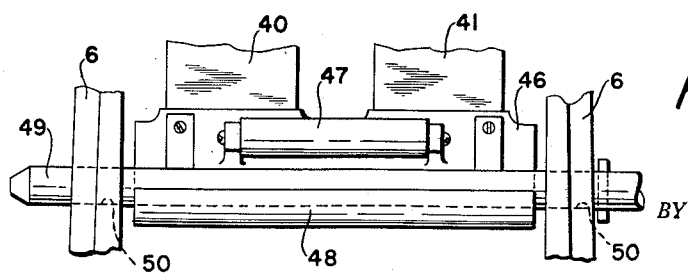
Fig. 6 is a view along the line 6—6 of Fig. 2.

The flexible steel strap 39 is provided above the mandrels to serve as a pressure member. The strap has two portions 40 and 41 (see Fig. 1) which extend across the top of the guideway 3 over the mandrels. One end 42 of strap 39 is formed with a loop 43 which fits between the pair of vertical plates 5 at the one end of the base and is fastened there by a pin 44 which extends through the loop and through holes 45 located opposite each other in the plates 5. The opposite end 46 of strap 39 fits between the pair of vertical plates 6 and is provided with a handle 47 which has a hook-shaped portion 48 to engage a pin 49 which fits crosswise between the plates in the manner shown in Fig. 6. Pin 49 extends through the holes 50 which are located opposite each other in the plates 6. The plates 5 and plates 6 are provided with several sets of holes 45 and 50, respectively, and the pins which fit through these holes are removable so that the ends of the strap may be fastened in several different positions relative to the plates so as to provide a tight fit regardless of the thickness of the material placed above the top surfaces of the mandrels. The strap may be removed from its position across the guideway by simply pushing the handle 47 downwardly and backwardly to disengage the hood 48 from pin 49.

The cylinder 10 is preferably operated by air pressure which is supplied by the line 53. A suitable pressure regulator valve 54 is provided and a pressure gauge 55 is also provided at the top of the cylinder. When air pressure is introduced into the cylinder the piston rod 12 is forced down. This rocks the arm 16 about the pivot 17 so that the inner end 20 of the arm is moved upwardly and the boxes 28 and 29 carrying the mandrels are urged upwardly. Figs. 2 shows the position of the equipment in operation with a brake shoe 33 supported on the front mandrel 31 and the fresh lining material 56 pressed against the brake shoe by the portion 41 of the strap.

The mandrel structure

Figures 3, 5:
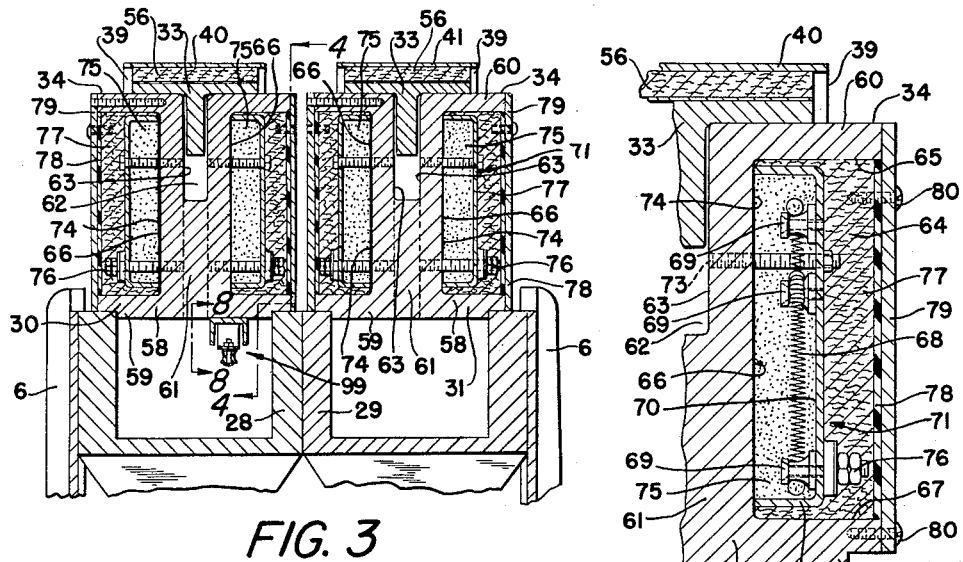
Fig. 3 is a cross-sectional view taken on the line 3—3 of Fig. 2.
Fig. 5 is an enlarged cross-sectional view of a portion of the preferred mandrel taken along the line 5—5 of Fig. 4.
Figure 4:
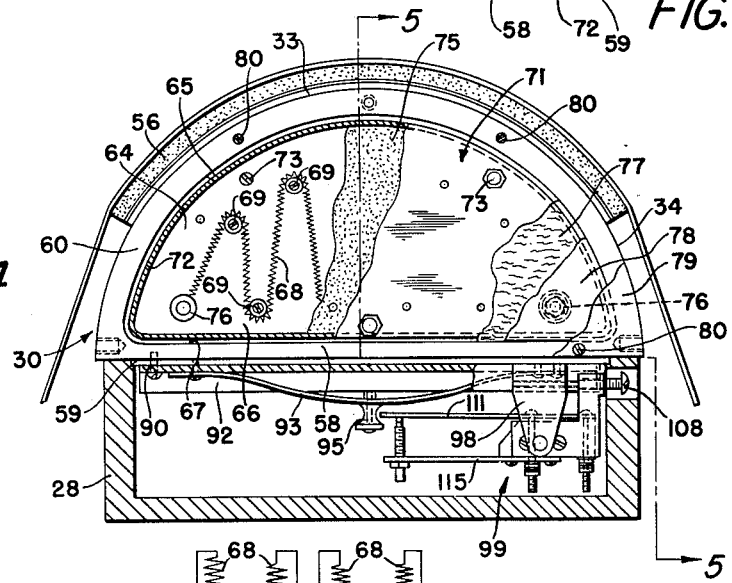
Fig. 4 is an enlarged side view of one of the mandrels and the thermostat, the mandrel having side portions progressively broken away to show the internal structure.

The structural details of the improved mandrel are most clearly brought out in Figs. 3, 4 and 5. Each mandrel is preferably formed from an aluminum casting. The casting has a bottom 58 which is substantially rectangular. When the mandrel is to be used with the type of bonding device shown in Figs. 1 and 2 the bottom is supported on the upper edge of a supporting box such as box 28 or 29, and the bottom has an inwardly stepped portion 59 which fits inside the top of the box to prevent the mandrel from moving laterally. The flange of a brake shoe is supported on surface 34 of the arcuately curved wall 60 which arches lengthwise across the bottom 58 so that from the side the casting resembles the letter D turned over on its straight side (Fig. 4). The upper convex surface 34 of wall 60 is machined smooth to the curvature of the flange so that the bottom of the flange fits snugly against it. Ordinarily the surface 34 will be arcuately curved to fit a brake shoe having a 9-inch radius of curvature since this is the smallest shoe commonly used for automobiles, etc.

Between the bottom 58 and the upper wall 60 there is a relatively thick, vertical wall 61 which extends lengthwise of the casting along the longitudinal center of the bottom. The peripheral slot 62 extends radially inwardly along the longitudinal centerline of the convex surface 34 into the thick wall 61. This slot is to receive the web of the shoe. The inwardly facing surfaces 63 which define the sides of the slot are machined smooth to increase their heat-radiating properties.

On each side of the casting there is cavity 64 defined by the lower, concave surface 65 of wall 60, the outwardly facing surface 66 of the vertical, centerwall 61; and the upper surface 67 of bottom 58. A heating unit such as is shown in the fragmentary, cross-sectional view, Fig. 5, is mounted in each of the side cavities. Each heating unit includes a resistance coil 68 which is threaded around the small porcelain posts 69 which are mounted on the flat, center area 70 of a cup-shaped member 71, which may be made of metal. The peripheral flange 72 of the cup 71 surrounds the coil 68 and the cup 71 fits into its respective cavity with the edge of the flange 72 abutting the vertical surface 66 of the cavity. It is secured in the cavity (see Fig. 5) by the studs 73 which extend through the flat, center area 70 of the cup and are threaded into the centerwall 61 of the casting. Before the cup is fastened in the cavity, the surface 66 is coated with cement 74, and suitable insulating clay 75 is packed around the heating coils inside the cup. The cup is completely filled with this clay. The cement bonds the clay to the wall and the clay efficiently transfers heat to the wall 61. Suitable terminals 76 to which power supply leads are connected are located on the outside surface of the cup and are connected to the coil 68. For clarity, these leads are shown only in the wiring diagram, Figure 7.

After the cup is fastened in the cavity its outside surface is covered with a heat-insulating material such as fiber glass or rock wool 77. This insulating material is covered with a sheet of mica 78 and then the cavity is covered completely by a flat sheet of aluminum 79 which is fastened against the edges of the bottom 58 and the curved wall 60 by the screws 80.

The curved wall 60 is heated rapidly by the heating coils and the flange of the brake shoe resting on surface 34 is heated by conduction. The centerwall 61 is also heated rapidly by conduction from the heating coils, and heat is radiated from the inner surface of the slot against the web of the brake shoe. In this manner the brake shoe is uniformly heated in a very short period.

The adapters

The preferred mandrel is designed to receive 9-inch brake shoes. In order to utilize the mandrel for bonding lining to larger brake shoes, adapters such as the adapter 81 (Fig. 11) are provided to fit onto the surface 34 of the mandrel. Several adapters of different sizes are provided for each mandrel so that brake shoes of several different sizes may be handled on the single mandrel. Each adapter is curved. Its lower concave surface 82 has the same curvature as surface 34 of the mandrel so that the adapter fits snugly on the top of the mandrel. The convex surface 83 of the adapter is machined smooth to support the flanges of a brake shoe of a particular size. The adapter has a longitudinal slot 84 (Fig. 12) through it, which is located to register with the slot 62 of the mandrel so that the web of a brake shoe fits through this slot and into the slot in the mandrel.

The ends of each adapter are provided with downwardly projecting bosses 85, each of which has a short slot 86 cut upwardly from the lower edge of the boss (see Fig. 12). These slots fit around the short dowels 87 which are threaded into the ends of the bottom of the mandrel. This engagement prevents lateral movement of the adapter on the mandrel. To remove the adapter it is raised upwardly away from the dowels 87. The bosses are so located on the different adapters that the adapters may be used interchangeably on the mandrel and each will engage the dowels 87.

An unusually wide brake shoe may be relined in this equipment by placing adapters of the proper curvature on the two mandrels, and then placing the brake shoe astride both of these with its web between the two mandrels.

The thermostatic control device

The structural details of the improved thermostat are brought out in Fig. 4 and in Figs. 8–10. A single thermostat may be used to control the temperature of both mandrels in the preferred bonding device. As shown in Figs. 1 and 3 the thermostat is mounted on the bottom surface of mandrel 30 and it projects down into box 28 and is completely enclosed inside the box. It includes a channel-shaped member 90 with a rigid base which is fastened against the bottom of the mandrel by the screws 91. The channel is located with its side flanges 92 directed downwardly. Between the flanges of the channel there is a thin flexible Invar strip 93 about the same length as the channel but the ends of this strip are fastened to the channel inwardly from the ends of the channel by the screws 94 so that the center portion of strip 93 is bowed downwardly below the flanges of the channel. At the crest of the bowed portion, a porcelain fitting 95 is bolted to the strip 93. This extends downwardly and has a ridge portion 96 around its lower end.

At one end of the channel there is a downwardly projecting boss 98 to which the breaker element 99 is pivotally fastened. The breaker element includes a block 101 of a non-electrical conducting material such as a pressed fiber composition. Brass plate 103 is fastened to one side of it by the flat-head screws 104 (Fig. 8). The other side of the brass plate 103 is tightened against the side of boss 98 by shoulder screw 106 which extends through the boss and is threaded into the brass plate 103. The angular position of the block 101 relative to the boss 98 is adjusted by the screw 108 in which the pitch of the portion of larger diameter is greater than the portion of smaller diameter. Adjustment of this screw varies the distance of the contact point 118 from the channel 90. The closer this contact point is to the channel, the less the Invar strip must be bowed to make contact and the higher the temperature at which the thermostat operates. Conversely, the farther the contact point is from the channel, the lower the temperature at which the thermostat operates. The outer end of the screw 108 is threaded through boss 109 which projects upwardly from the end of the brass plate 103 toward the channel. The inner end of this screw is of smaller diameter than said outer end and is threaded into the tapped hole 110 which extends into the upper portion of the boss 98. The threads on the inner end are of smaller pitch than those on the outer end. Consequently, for each revolution of the screw the inner end moves a shorter distance in the boss 98 than the outer end moves in boss 109. Therefore, when the screw 108 is turned the angular relation of the bosses 98 and 109 is altered. This swings the contact point 118 nearer or farther from the channel. The head of the screw 108 is exposed through an opening in the box 28 (Figures 1 and 4) so that adjustment of the temperature at which the thermostat operates can be effected without removing the thermostat or mandrel from its operating position.

The thin flat springs 111 is fastened along the upper edge of block 101 by the heads of the terminal screws 112 and 113 which extend downwardly through the block. Spring 111 extends away from the block toward the porcelain fitting 95 and the tip 114 of this spring rests on the ridge 96 of the fitting. On the lower edge of block 101 there is a metal bar 115 which projects outward from the block parallel to spring 111. This bar is secured to the block 101 by the screws 116 and the terminal 113 is in contact with bar 115. The outer end of this bar has an adjustable screw 117 threaded upwardly through it and on the upper end of this screw there is a contact point 118 which fits against the corresponding contact point 119 near the tip of spring 111. Terminal screw 113 is insulated from spring 111 by a small washer 120, so that when a potential difference is impressed across terminals 112 and 113 current may flow, for example, through the spring 111, through the contact points 118 and 119 and then through the bar 115.

The bowed strip 93 to which the porcelain fitting 95 is fastened is preferably formed of Invar—a nickel-steel alloy containing about 36 per cent nickel and having a very low coefficient of thermal expansion. The channel, however, is formed of a material which has a relatively high coefficient of expansion, preferably cast iron. As the mandrel is heated the channel 90 elongates more than the Invar strip 93. Therefore strip 93 tends to straighten and as a result the porcelain fitting 95 is moved toward the channel. The ridge 96 engages the tip 114 of spring 111 as the fitting moves toward the channel and eventually pulls contact point 119 away from the stationary contact 118, thereby breaking the circuit across the terminals 112 and 113. The thermostat may be regulated by turning the screw 108 so that the tip 114 of spring 111 is moved closer to or farther away from the ridge 96 of fitting 95 and the fitting 95 will thereby break the circuit across the terminals when the mandrel is at the desired temperature. As shown in the wiring diagram in Fig. 7, the thermostat 123 is connected in the power supply circuit to the heating coils in the mandrels, and as soon as the thermostat is opened the power supply to the mandrels is broken. Conversely, as the mandrels cool, the Invar bar expands and bows out, bringing the contact points 118 and 119 together again so that the circuit is re-established and heating is resumed.

This thermostat is particularly sensitive to changes in temperature of the mandrels, and is designed so that it is not influenced by other changes in temperature.

*The improved regulating means for the bonding device and the operation thereof*

Figure 7:
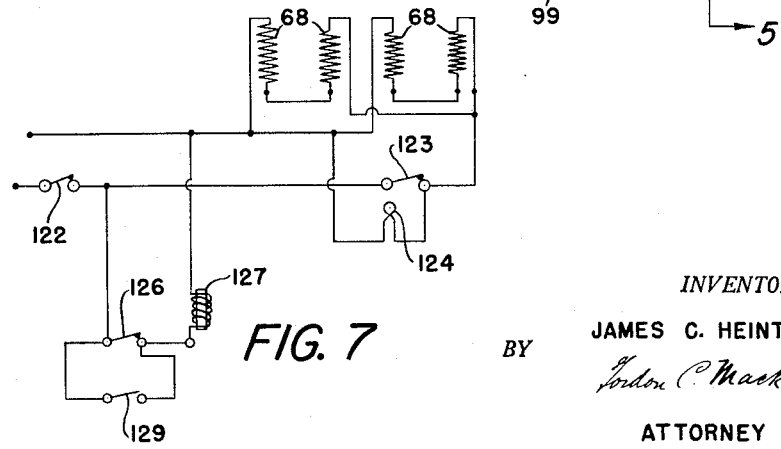
Fig. 7 is a schematic wiring diagram of the control circuits.

The operation of the preferred equipment and the regulating means is best explained with reference to the wiring diagram in Fig. 7.

The brake shoes are placed on the mandrels together with fresh lining and a layer of adhesive between them. Then the switch 122 located on the switch box between the front vertical plate 6 (see Fig. 1) is closed. Current flows through the thermostat (numeral 123 of Fig. 7) and through the heating coils 68 of the two mandrels. A light 124 (Figs. 1 and 7) is connected across the supply line in the circuit with the thermostat so that when the thermostat is closed the light visually indicates that power is being supplied to the coils. The preferred curing temperature is about 400° F. and the thermostat 123 is set so that the mandrels maintain the brake shoes at this temperature during the cure. An ordinary 110-volt A. C. outlet will furnish sufficient power to operate the device.

The timer switch 126 (see Figs. 2 and 7) is in the circuit with the solenoid-operated valve 127 fastened to the side of the air cylinder 10. This valve controls the flow of air into the cylinder. As soon as switch 122 is closed and the timer 126 is started, the solenoid is energized so that the valve 127 is opened to admit air into the cylinder and then the piston rod 12 forces the mandrels upwardly in the guideway and presses the brake shoes into contact with the flexible pressure member 39. The timer switch 126 is set to open the valve 127 and release the air, thereby automatically releasing the pressure on the brake shoes after the cure is completed.

If the mandrels are hot when the brake shoes are inserted the curing time for a 9-inch brake shoe, for example, is about five minutes. If the mandrels are cold when the brake shoes are inserted switch 129 (see Figs. 2 and 7) is closed to by-pass the timer 126 until the mandrels are heated sufficiently. Also, if a cold adapter is placed on the mandrel the by-pass switch 129 may be used to permit the adapter to be heated by the mandrel to curing temperature. When the equipment is cold it may take fifteen to thirty minutes to heat the mandrel and adapters but after they are heated the by-pass switch 129 is opened and the timer 126 is then energized to operate the equipment in the normal manner.

The invention is defined by the appended claims.

What I claim is:

1. A thermostat comprising an elongated first member of a material having a relatively high coefficient of linear expansion and means for fastening the bottom of the same against the object the temperature of which is to be controlled by the thermostat, a second member of a material having a relatively low coefficient of linear expansion, the second member being fastened to the top of the first member so that a portion of the second member intermediate its ends is bowed away from the first member, a boss on the first member and a support pivotally fastened thereto and located below the second member, two terminals on the support, two conducting materials extending from the support each bearing one of a pair of contact points, one of the contact points being moved by movement of the bowed portion of said second member, the other contact point being moved by movement of the support on said pivotal fastening whereby the temperature at which the thermostat operates is controllable by pivotal movement of the support with respect to the first member.

2. The thermostat of claim 1 in which there is a projection from the support which extends across a lateral extension of the first member, an opening in the projection and an opening in the extension in alignment therewith, and an adjustment screw threaded into the openings, the first mentioned opening and the portion of the screw threaded therein being of larger diameter and provided with a wider pitch than the second mentioned opening and portion of the screw threaded therein.

References Cited in the file of this patent

UNITED STATES PATENTS

| Number | Name | Date |
|---|---|---|
| 1,643,575 | Clark | Sept. 27, 1927 |
| 2,217,328 | Barnes | Oct. 8, 1940 |
| 2,248,666 | Fischer | July 8, 1941 |
| 2,376,253 | Humphrey | May 15, 1945 |
| 2,434,379 | Wiesner et al. | Jan. 13, 1948 |
| 2,489,496 | O'Brien | Nov. 29, 1949 |
| 2,520,978 | Super | Sept. 5, 1950 |
| 2,549,054 | Burling | Apr. 17, 1951 |
| 2,559,748 | Batchelor et al. | July 10, 1951 |
| 2,566,198 | Hem | Aug. 28, 1951 |
| 2,569,737 | Spanich | Oct. 2, 1951 |
| 2,584,924 | Reingruber et al. | Feb. 5, 1952 |
| 2,598,363 | Davis | May 27, 1952 |